(12) United States Patent
Trebbi et al.

(10) Patent No.: US 7,114,616 B2
(45) Date of Patent: Oct. 3, 2006

(54) DEVICE FOR REMOVABLE FASTENING OF SEATS FOR HOUSING CONTAINERS TO A METALLIC BELT CONVEYOR

(75) Inventors: Claudio Trebbi, Medicina (IT); Gabriele Gabusi, Castenaso (IT)

(73) Assignee: I.M.A.-Industria Macchine Automatiche, S.p.A., Orzano (IT)

( * ) Notice: Subject to any disclaimer, the term of this patent is extended or adjusted under 35 U.S.C. 154(b) by 60 days.

(21) Appl. No.: 10/480,499

(22) PCT Filed: Jun. 10, 2002

(86) PCT No.: PCT/IB02/02105

§ 371 (c)(1),
(2), (4) Date: Mar. 4, 2004

(87) PCT Pub. No.: WO02/100745

PCT Pub. Date: Dec. 19, 2002

(65) Prior Publication Data

US 2004/0144627 A1    Jul. 29, 2004

(30) Foreign Application Priority Data

Jun. 12, 2001  (IT) .......................... BO2001A0370

(51) Int. Cl.
*B65G 29/00*   (2006.01)

(52) U.S. Cl. ............................ 198/867.01; 198/867.06; 198/867.11

(58) Field of Classification Search ........... 198/867.01, 198/867.06, 867.11, 867.14, 867.15
See application file for complete search history.

(56) References Cited

U.S. PATENT DOCUMENTS

| | | | | |
|---|---|---|---|---|
| 2,954,113 A | * | 9/1960 | Hibbard et al. | 198/867.15 |
| 4,535,963 A | * | 8/1985 | Lachonius | 248/251 |
| 4,684,012 A | * | 8/1987 | Feddersen | 198/867.05 |
| 4,807,421 A | * | 2/1989 | Araki et al. | 53/167 |
| 4,809,846 A | * | 3/1989 | Hodlewsky et al. | 198/853 |
| 4,829,751 A | * | 5/1989 | Tisma | 53/575 |
| 5,196,062 A | * | 3/1993 | Bergmann et al. | 118/69 |
| 5,529,168 A | * | 6/1996 | Soriano et al. | 198/465.1 |

(Continued)

*Primary Examiner*—Gene O. Crawford
*Assistant Examiner*—Rashmi Sharma
(74) *Attorney, Agent, or Firm*—William J. Sapone; Henry Coleman; R. Neil Sudol

(57) ABSTRACT

The device (D) for removable fastening of seats (3) housing containers (C) to a metallic belt (1) includes first fastening means (10) made on the metallic belt (1) and aimed at being mutually coupled with second fastening means (34), made in the lower part of the seats (3) to position and lock the seats (3) to the belt (1). The device includes also supporting and sliding guides (4,5), facing each other and situated below and substantially orthogonal to eh metallic belt (1). The guides (4,5) are operated by operating means, between a first gripping configuration (P), in which they are vertical and constitute an abutment for the second fastening means (34), so as to define a fastening between the metallic belt (1) and the seats (3) for housing containers (C), and a second release configuration (R), in which at least one of the guides (4,5) is moved away from the second fastening means (34), so as to allow the seats (3) to be removed from the metallic belt (1).

8 Claims, 4 Drawing Sheets

U.S. PATENT DOCUMENTS 5,586,644 A * 12/1996 Coen et al. .................. 198/853
5,769,203 A * 6/1998 Marti Sala ............. 198/397.01
6,176,369 B1 * 1/2001 Petrovic ................ 198/867.11
6,209,716 B1 * 4/2001 Bogle et al. ................. 198/852
6,347,699 B1 * 2/2002 Ramsey ...................... 198/852
6,601,697 B1 * 8/2003 Steeber et al. ........... 198/844.1
6,761,264 B1 * 7/2004 Steeber et al. ........... 198/844.1

* cited by examiner

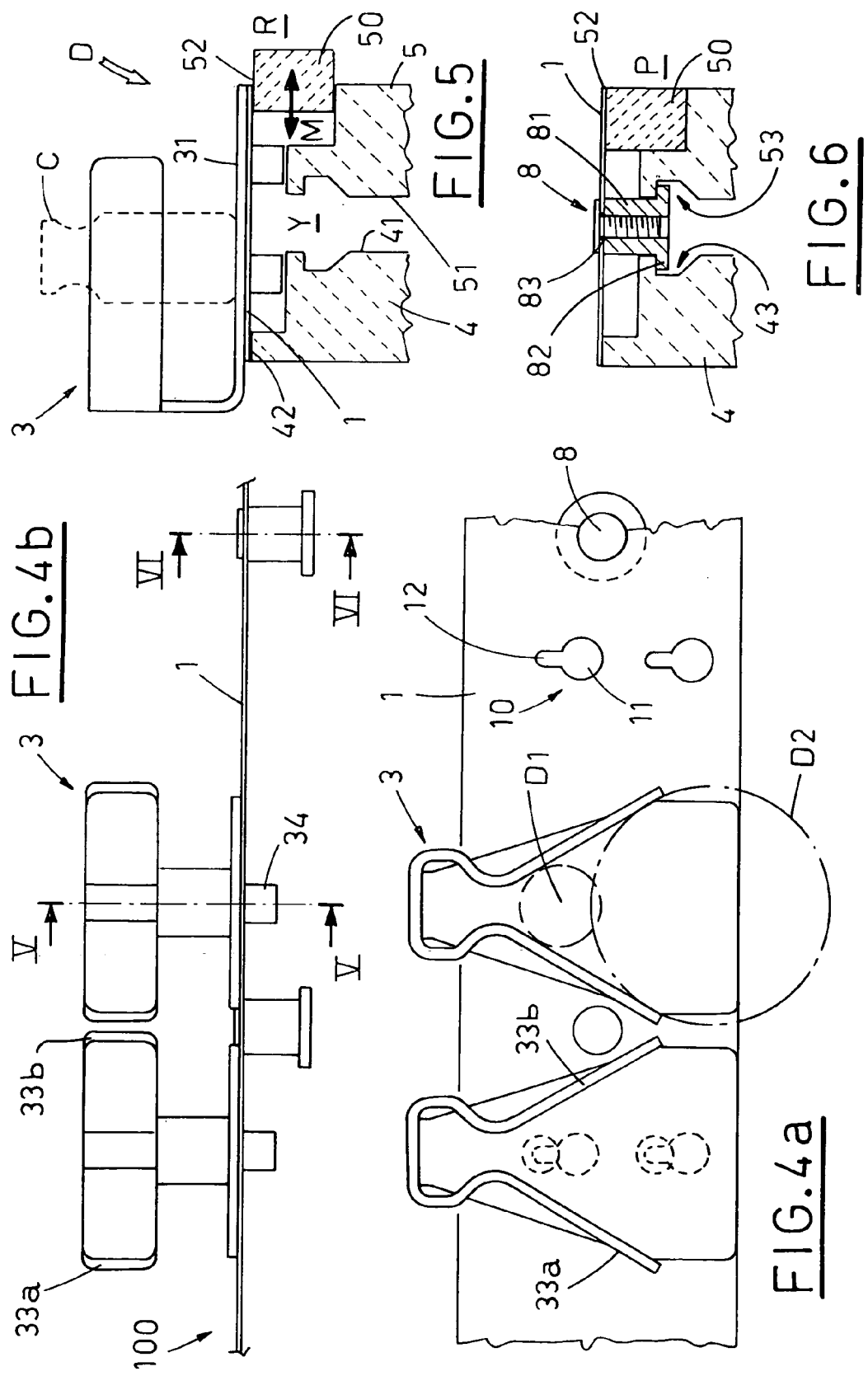

DEVICE FOR REMOVABLE FASTENING OF SEATS FOR HOUSING CONTAINERS TO A METALLIC BELT CONVEYOR

FIELD OF THE INVENTION

The present invention relates to technical field concerning packaging articles into relative containers moving forward along belt conveyors, and in particular it refers to a device for the removable fastening of seats for housing containers to a metallic belt conveyor.

DESCRIPTION OF THE PRIOR ART

It is known that packaging articles into relative containers in some specific production fields, as for instance in pharmaceutical field, requires manipulating in as sterile, or aseptic as possible environment or within an isolated environment fed with filtered air.

This allows to obtain packaged articles free from impurities and bacterial contamination.

For this purpose, metallic belts sliding on stationary sliding surfaces move the containers, e.g. bottles, forward, because the metallic belts can be easily sterilized.

In particular, a person skilled in the art knows conveying means, which include one or more metallic belts equipped with prongs fastened rigidly thereto.

Pairs of prongs define suitable seats for receiving/housing containers, which are pulled by the belt.

According to a system known to those skilled in the art, the conveying means include an endless metallic belt, driven by a pair of training pulleys, driving and driven respectively, on respective stationary sliding surfaces, made of e.g. Teflon.

The belt has a loop-like configuration, with an upper active run and a lower return run.

The belt is driven in a longitudinal direction with respect to the extension thereof and in a pulling direction of the driving pulley, which is situated at the downstream extremity of the active run.

A particularly important problem results from the necessity for cleaning and sterilization of the belt as well as of the seats for receiving containers in short time, so as not to affect the productivity, and in a simple and efficient way.

It is obvious that cleaning and sterilization operations of the metallic conveying belts equipped with prongs fixed thereon need considerable amounts of time and present great difficulties in the complete sterilization operation, specially of the areas, where the prongs are fastened to the belt.

The EP-A-0884254 discloses an apparatus for conveying groups of products or packs coming from a production line and directed to a cartoning machine. The apparatus comprises an endless metal belt on which groups of pockets are removably fixed so as to be replaceable with pockets of different size.

SUMMARY OF THE INVENTION

The main object of the present invention is to propose a device for removable fastening of seats for housing containers to a metallic belt conveyor, which avoids the above mentioned drawbacks, not yet solved in the prior art.

More precisely, the specific object of the present invention is to propose a device for removable fastening of seats for housing containers to a metallic belt conveyor, which allows to remove all the housing seats fastened to the metallic belt, thus allowing rapid and safe sterilization operations.

Another object of the present invention is to propose a device that allows the substitution of the housing seats fastened to the metallic belt with others, of different size, in a simple, practical and extremely rapid way.

A further object of the present invention is to propose a device that assures a stable and efficient fastening of seats for housing containers to the metallic belt in any working condition.

A still further object of the present invention is to propose a device for removable fastening of seats for housing containers to a metallic belt, obtained by a simple and extremely reliable technical solution.

The above-mentioned objects are obtained in accordance with the contents of the claims, by a device for removable fastening of seats housing containers to a metallic belt, said metallic belt being powered and being aimed at receiving said containers and at moving the latter, in cooperation with said seats, along an active sliding surface and in a predetermined forward direction, said device being characterized in that it includes first fastening means made on said metallic belt and aimed at being mutually connected with second fastening means, made in the lower part of said seats to position and lock said seats to said belt; the mutual fastening between said first and second fastening means allowing the seats to move crosswise with respect to said belt and to said direction between a first unlocking position, in which said first and second fastening means are unlocked, and a second working position, in which said first and second fastening means are mutually locked.

BRIEF DESCRIPTION OF THE DRAWINGS

The characteristic features of the present invention will be pointed out in the following description of a preferred, but not only embodiment of a device for removable fastening of seats for housing containers to a metallic belt, with reference to the enclosed drawings, in which:

FIG. 4a is a top view, of the seats for housing containers fastened to a metallic belt conveyor by the proposed device;

FIG. 4b is a front view of the seats for housing containers fastened to a metallic belt conveyor by the proposed device;

FIG. 5 is a section view taken along V—V of FIG. 4b showing another embodiment of the proposed device for removable fastening of seats for housing containers to a metallic belt;

FIG. 6 is a section view taken along VI—VI of FIG. 4b.

BEST MODES OF CARRYING OUT THE INVENTION

With reference to the enclosed drawing, D indicates the device for removable fastening of seats for housing containers to a metallic belt 1.

The metallic belt 1 can be driven by relative motor means, known from the Italian Patent IT 1.286.822, e.g. a pair of training pulleys driving and driven respectively (not shown), and may have a close-loop configuration, with an upper run defining an active sliding surface 100 (FIG. 1) moving containers C, placed within respective seats 3, in a longitudinal direction W, through subsequent working stations (for filling, weighing, sealing, etc.)

Figure 2A:
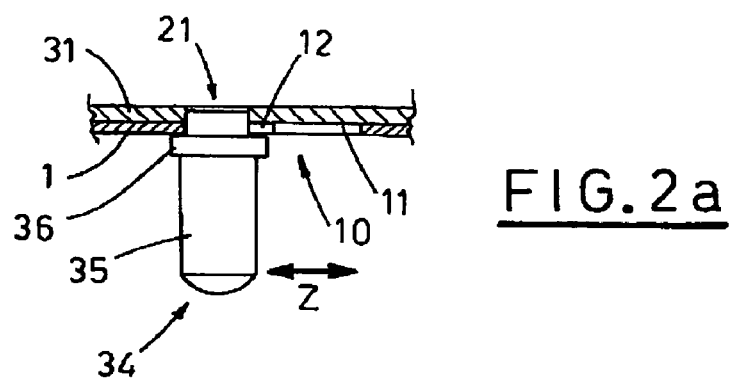
FIG. 2a is an enlarged view of a particular indicated with K in FIG. 2.

The device D includes first fastening means 10, made on the metallic belt 1, aimed at being engaged by second fastening means 34 made in the lower part of the seats 3 (FIG. 2a).

For this purpose, the seats 3 include a base element 31 defining a plate for resting on the metallic belt 1, and two lateral retaining walls 33a and 33b, supported by the plate and arranged spread apart with respect to each, tending to diverge.

This allows the seats 3 to receive, between the lateral walls 33a and 33b, containers C of different sizes, in particular containers C having a diameter included between a minimum value D1 and a maximum value D2 (see for instance FIG. 4a).

Consequently, the metallic belt 1, with the seats 3 coupled therewith, can receive and transport a wide range of containers C of different dimensions, allowing the packaging of different products without awkward operations, performed by the personnel, for substituting the seats 3 to adapt them to different dimension of the containers C.

The mutual connection between the above mentioned first 10 and second 34 fastening means allows on one hand, to position the seats 3 for the containers C on the metallic belt 1, and on the other hand, to lock the seats 3 vertically, preventing them from detaching from the belt 1 when the belt follows the lower return run (not shown). Actually, the mutual connection between the first 10 and second 34 fastening means is such as to allow the seats 3 to be displaced crosswise to the belt 1 (direction Z in FIG. 1 and FIG. 2a) between a first unlocking position 20, in which the first 10 and second 34 fastening means are unlocked, and a second working position 21 (shown in FIG. 2a), in which the first 10 and second 34 fastening means are mutually locked.

The first fastening means 10 include pairs of through slots, made crosswise in the belt 1; each slot of the pairs of slots has a circular hole 11, which receives freely the second fastening means 34 and communicates with a lateral channel 12, whose section is smaller than that of the hole 11, and that id arranged along the transversal direction Z.

The second fastening means 34 include, pins 35 fastened to the lower part of the base 31 of the seats 3 and equipped with tubular protrusions 36, which touch the walls of the above mentioned channels 12 of the first fastening means 10 in order to obtain the mutual fastening between the housing seats 3 and the belt 1.

Figure 1:
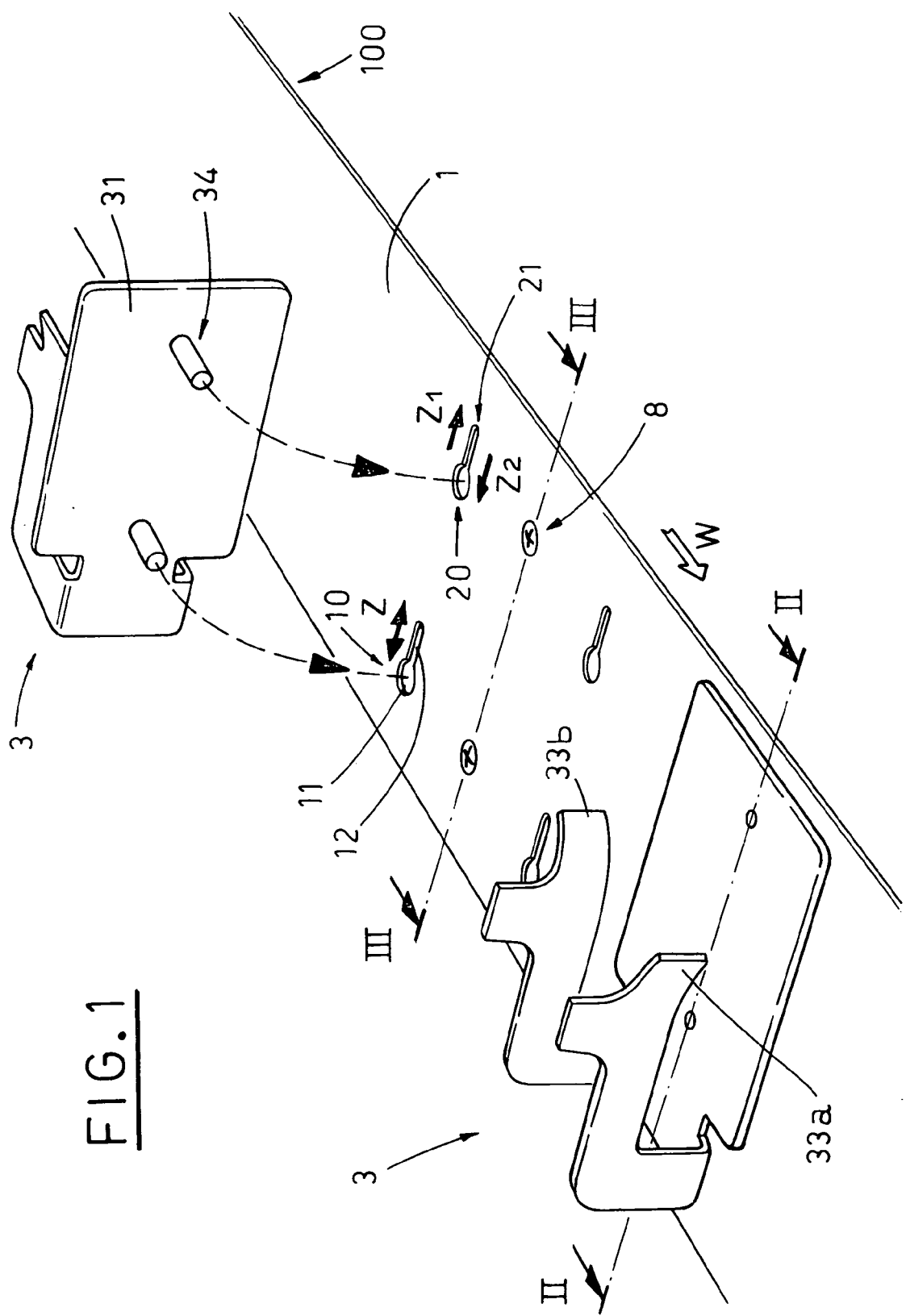
FIG. 1 is a fragmentary perspective view of a metallic belt conveyor, to which seats for housing containers are fastened.

In practice, as well shown in FIG. 1, the pins 35 engage with the holes 10, allowing the seats 3 to be positioned on the belt and defining the first rest position 20: in this configuration the seats 3 are only placed on the belt 1 and not yet fastened thereto.

The forward movement of the housing seats 3 toward the second working position 21 makes the pins 35 slide inside the channels 12 and simultaneous touching of the tubular protrusions 36 against the walls 12 of the channels (FIG. 2a): in this configuration the seats 3 are locked, preventing any relative vertical movement with respect to the belt 1.

Figure 2:
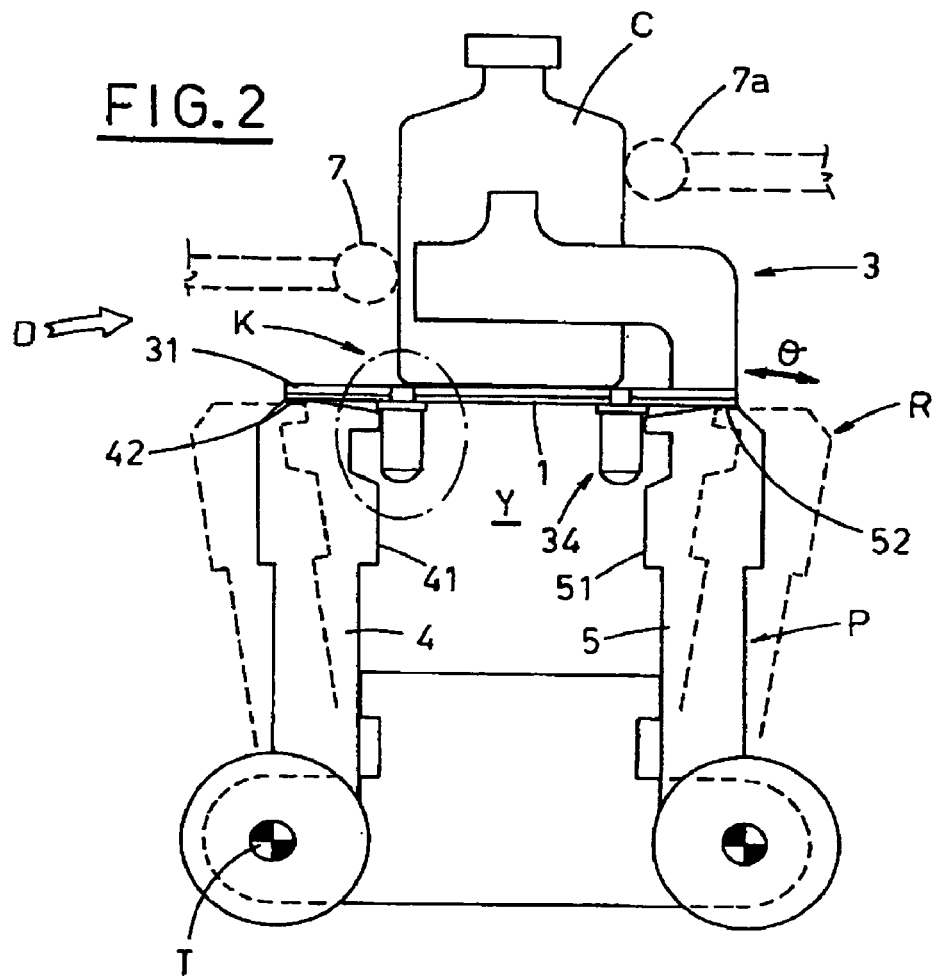
FIG. 2 is a section view taken along II—II of FIG. 1 showing the proposed removable fastening device of the seats for housing containers to a metallic belt.

According to what gas been shown in FIG. 2, longitudinal bars 7, 7a against which the walls of the containers C abut, are situated above the belt 1, to help the transfer of the containers C by the belt 1 together with the seats 3.

The device D includes also, as shown in FIGS. 2, 5 and 6, a pair of supporting and sliding guides 4, 5, facing each other and situated below the metallic belt 1 and substantially orthogonal thereto.

The guides 4, 5 define, between the relative inner opposite walls 41, 51, a free space area Y, into which the pins 35 of the second fastening means 34 extend when they are in locked configuration with the first fastening means 10.

Moreover, the guides 4, 5 form respective surfaces 42, 52, on part of which the metallic belt 1 is supported and slides.

The guides 4, 5 also feature, in the relative opposite walls 41, 51 suitable indentations 43, 53, of substantially longitudinal extension, which are engaged in mutual sliding coupling with stabilizing means 8, associated to the metallic belt 1.

Figure 3:
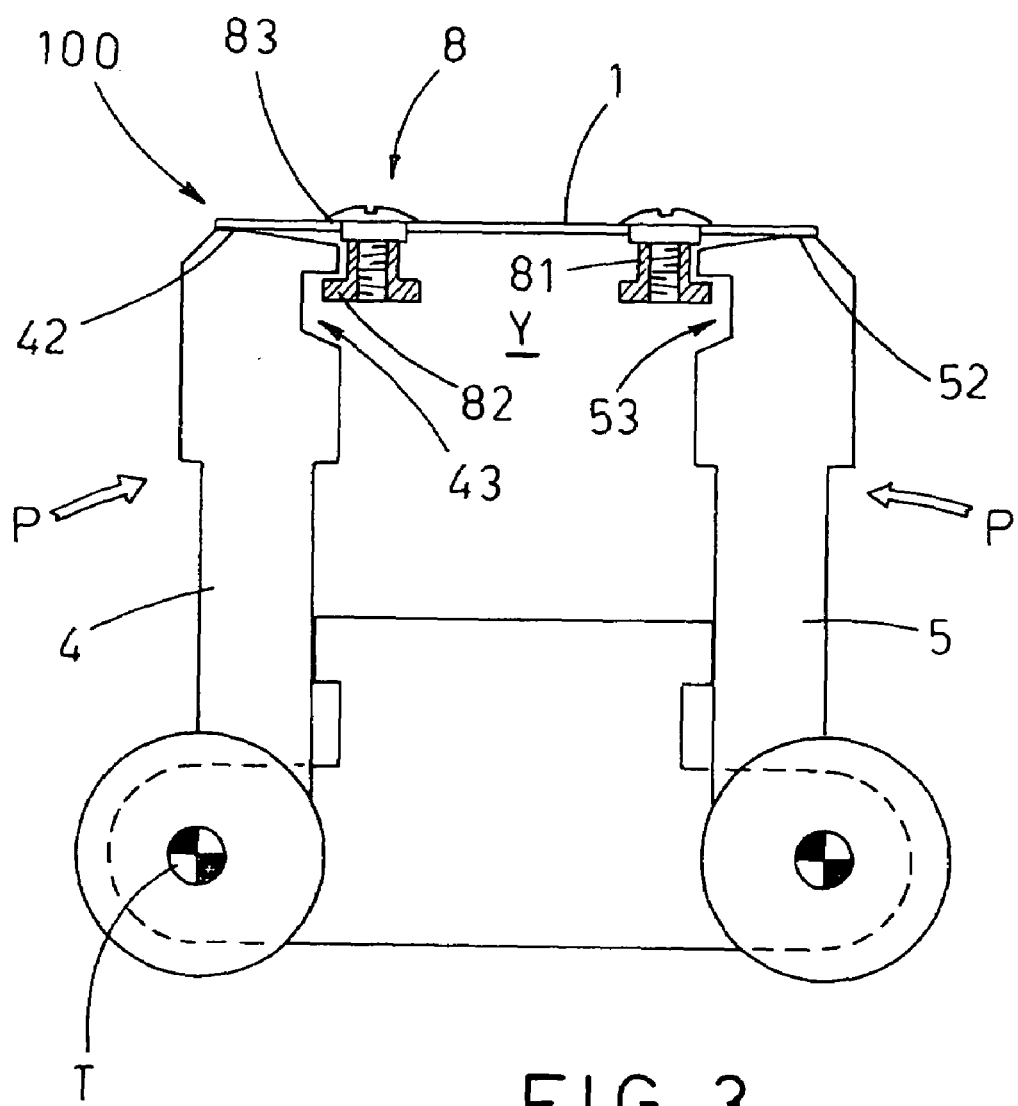
FIG. 3 is a section view taken along III—III of FIG. 1.

The stabilizing means 8 include, as shown for instance in FIG. 3 and in FIG. 6, pins 81 inserted into complementary stabilizer seats 83 made on the metallic belt 1, alternating with the first fastening means 10, and equipped with tubular protrusions 82, engaging with the indentations 43, 53 of the supporting and sliding guides 4, 5.

The coupling between the stabilizing means 8 and the indentations 43, 53 allows guiding the sliding of the metallic belt 1 on the guides 4, 5 maintaining the belt centered with respect to the guides 4, 5 and, at the same time, prevents the belt 1 from moving far from the guides 4, 5 in the region of its lower run.

Relative driving means, not shown in detail since of known type, are connected to the supporting and sliding guides 4, 5, so as to move the latter between a first gripping configuration P (FIG. 2 with continuous line, FIG. 3 and FIG. 6), in which the guides 4, 5 are arranged substantially vertical and in abutment against the pins 35 of the second fastening means 34, which are in the second working position of mutual connection with the first fastening means 10, and a second release position R (FIG. 2, dotted line, FIG. 5), in which at least one of the guides 4, 5 is moved away (according to the technique described later) by the relative pins 35 of the second fastening means 34.

The positioning of the guides 4, 5 in their first gripping position P defines an abutment for the pins 35 of the second fastening means 34 and allows the housing seats 3 to be fastened to the metallic belt 1 in the transversal direction Z in a stable way.

Actually, in this configuration, the guides 4, 5 prevent the pins 35 of the second fastening means 34 from sliding in the channels of the first fastening means 10.

The positioning of at least one guide 4, 5 in the relative release configuration R, i.e. moved away from the pins 35 of the second fastening means 34, allows the housing seats 3 to slide transversely in direction Z2 toward said first position 20, in which the pins 35 of the second fastening means 34 and the slots of the first fastening means 10 are unlocked.

In order to unlock the seats 3 in direction Z crosswise to the metallic belt 1 in order to allow its removal, it is enough to operate only one of the guides 4, 5 moved away from the pins 34: in particular, the supporting and sliding guide, toward which the holes 11 of the slots of the first fastening means 10 (the one on the right looking at FIGS. 2 and 4) are turned, is operated.

For this purpose, according to a first embodiment of the proposed device D, the supporting and sliding guides 4, 5 are pivoted at relative longitudinal axes T, arranged parallel with respect to the forward movement direction W of the metallic belt 1.

Therefore, the guides 4, 5 can be driven, by relative driving means, to rotate (angle O) on respective axes T, to define the two configurations, the first gripping configuration P (FIG. 2 with continuous line and FIG. 3), and the second release position R (FIG. 2, dotted line).

Otherwise, according to another possible embodiment of the device D, shown in FIGS. 5 and 6, at least one of the guides 4, 5, the one toward which the holes 11 of the first fastening means 10 are turned, is equipped with an upper extremity 50, which is moved by relative operating means crosswise to and below the metallic belt 1, so as to define the two configurations, the first gripping configuration P (FIG. 6), and the second release position R (FIG. 5).

The combination of the supporting and sliding guides 4, 5, moved so as to define two different configurations, the first gripping configuration P, and the second release position R, with the first fastening means 10 and the second fastening means 34, which can be positioned between a first unlocked position 20 and a second working, mutual locking position 21, allows on one hand to lock the housing seats 3 on the metallic belt 1 in the crosswise direction Z, and on the other hand, to lock the seats 3 vertically.

Moreover, due to the presence of the guides 4, 5 for supporting and sliding the belt, moved with respect to the belt, the proposed device D advantageously allows to remove all the seats 3 housing the containers C situated along one run, upper or lower, of the conveyor, at any stop configuration of the conveyor.

This advantageously allows cleaning and sterilizing all the surfaces, on which impurities and bacterial contamination can be present, of either the metallic belt, relative to the slots of the first fastening means, or housing seats 3, relative to the support plate and the lateral walls.

It is to be pointed out that the proposed device is obtained by a simple technical solution which facilitates, in an obviously advantageous way, the operations connected with the removal of the housing seats from the metallic belt, as well as the subsequent repositioning of the seats on the belt.

Furthermore, it is to be pointed out that the particular shape of the housing seats of variable section, advantageously allows to house containers of different dimensions without changing the latter each time different articles are to be packaged in containers of different dimension.

It is understood that what above, has been described as a pure, not limitative example, therefore, possible variants of the shape of the first 10 and second 34 means for fastening the housing seats 3 to the metallic belt 1 and the relative ways of operation thereof to define two different positions, holding P and release R, respectively, remain within the protective scope of the present technical solution, as claimed hereinafter.

What is claimed is:

1. A device (D) for removable fastening of seats (3) for receiving containers (C) on a metallic belt (1), said metallic belt (1) receiving the containers (C) and moving the containers in said seats (3), along an active sliding surface (100) in a predetermined forward direction (W), said device comprising:

first fastening means (10) made on said metallic belt (1) for mutually connecting to second fastening means (34), made in a lower part of said seats (3), for positioning and locking said seats (3) to said bell (1); said first fastening means (10) and said second fastening means (34) allowing the seats (3) to move crosswise wit respect to said direction (W) between a first unlocking position, in which said first fastening means (10) and said second fastening means (34) are unlocked, and a second working position, in which said first (10) and second (34) fastening means are mutually looked;

supporting and sliding guides (4,5) located opposite to each other and situated below said active sliding surface (100), substantially orthogonal to said metallic belt (1), and having opposed wails there between defining a free space area (Y), into which said second fastening means (34) extend, the supporting and sliding guides forming surfaces (42,52) on which the metallic belt (1) is supported and slides;

guide operating means for moving the supporting and sliding guides between a first gripping configuration (P), in which the guides are vertical and form an abutment for said second fastening means (34), to provide a secure fastening, said metallic belt being supported in a direction (z) crosswise to said direction (W), when said seats (3) for housing containers (C) are arranged in said second working configuration (21), in which said first (10) and second (34) fastening means are mutually locked, and a second release configuration (R), in which at least one of said guides (4,5) is moved away from said second fastening means (34), so as to allow said seats (3) to slide in a direction (Z2), crosswise to the forward direction (W), toward said first unlocked position (20), for removing said seats (3) from said metallic belt (1).

2. The device, according to claim 1 wherein said guides (4,5) have, in correspondence to the opposed walls (41,51) indentations (43,53) of longitudinal extension, which are slidingly engaged by stabilizing means (8), associated with the metallic belt (1), the coupling of said stabilizing means (8) and said indentations (43,53) defining a guide for centering said belt (1) on said supporting and sliding guides (4,5).

3. The device, according to claim 2, wherein said stabilizing means (8) include pins (81), introduced into through stabilizer seats (83) made on the metallic belt (1), and the pins having tubular protrusions (82) which engage said indentations (43,53) of said guides (4,5).

4. The device, according to claim 1 wherein said first fastening means (10) include pairs of through slots (11), made transversely to said belt (1) in the region of to said free space area (Y), each slot (11) having a circular hole (11) communicating with a lateral channel (12), whose cross section is smaller than a cross section of said hole (11); said second fastening means (34) being pins (35) having tubular protrusions, which are received within said holes (11) to define said first unlocked position (20), and which slide into said channels (12), so that said tubular protrusions (36) engage lateral walls of said channels (12) to define said second mutual locking position (21).

5. The device, according to claim 1 wherein at least one of said guides (4,5) is pivoted at a longitudinal axis (T), parallel to said forward movement direction (W), and is driven into rotation on the longitudinal axis (T) by said operating means between said first gripping configuration (P) and said second release configuration (R).

6. The device, according to claim 1 wherein at least one of said guides (4,5) has an upper end (50), being said supporting surface (52) for said belt (1) and being movable by said operating means, crosswise with respect to said belt (1), between said first holding configuration (P) and said second release configuration (R).

7. The device, according to claim 1 wherein said seats (3) have a base element (31) being a plate for resting on said belt (1) and two lateral walls (33*a*,33*b*), supported by the base element (31) and spread apart with respect to each other, and tending to diverge from each other so as to receive and hold containers (C) therebetween, said containers having a size ranging between a minimum predetermined value (D1) and a maximum predetermined value (D2).

8. The device, according to claim 1 further comprising at least one longitudinal bar (7,8), which is situated above said metallic belt (1) and against which said containers (C) abut for moving the containers (C) on the belt (1).

* * * * *